US009798555B2

(12) United States Patent
Zhong et al.

(10) Patent No.: US 9,798,555 B2
(45) Date of Patent: Oct. 24, 2017

(54) APPLICATION IMPLEMENTATION METHOD AND APPARATUS

(71) Applicant: TENCENT TECHNOLOGY (SHENZHEN) COMPANY LIMITED, Shenzhen Guangdong (CN)

(72) Inventors: Yusheng Zhong, Shenzhen Guangdong (CN); Shengwei Lin, Shenzhen Guangdong (CN); Deliang Zhu, Shenzhen Guangdong (CN); Difei Zou, Shenzhen Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/750,767

(22) Filed: Jun. 25, 2015

(65) Prior Publication Data

US 2015/0293769 A1    Oct. 15, 2015

Related U.S. Application Data

(63) Continuation of application No. PCT/CN2013/079402, filed on Jul. 15, 2013.

(30) Foreign Application Priority Data

Dec. 26, 2012 (CN) .......................... 2012 1 0575981

(51) Int. Cl.
*G06F 9/445* (2006.01)
*G06F 9/455* (2006.01)
*G06F 9/44* (2006.01)

(52) U.S. Cl.
CPC ................ *G06F 9/445* (2013.01); *G06F 8/61* (2013.01)

(58) Field of Classification Search
CPC ...... G06F 8/60–8/68; G06F 8/61; G06F 8/63; G06F 9/45533; G06F 9/44505; G06F 9/44536; G06F 9/445; G06F 21/31
See application file for complete search history.

(56) References Cited

U.S. PATENT DOCUMENTS 6,993,774 B1 *  1/2006  Glass ...................... G06F 9/465
                                                    719/315
7,210,121 B2 *  4/2007  Xia .......................... G06F 8/60
                                                    717/106

(Continued)

FOREIGN PATENT DOCUMENTS

CN       102023849 A     12/2000
CN         1641569 A      7/2005

(Continued)

OTHER PUBLICATIONS

Stackoverflow, "Why is the onCreate( ) in Activity protected?", [Online] Apr. 13, 2011, [Retrieved from the Internet] <http://stackoverflow.com/questions/5652661/why-is-oncreate-in-activity-protected> 2 pages total.*

(Continued)

*Primary Examiner* — Thuy Dao
(74) *Attorney, Agent, or Firm* — Brinks Gilson & Lione

(57) ABSTRACT

Application implementation methods and apparatus are described, which are used to implement a function of a target application without installation of the target function. An example method may include acquiring an installation package of the target application; generating a proxy interface for managing the target application; and dynamically loading, by the proxy interface, the installation package by using an operating parameter of a terminal, and starting an operation interface of the target application.

8 Claims, 4 Drawing Sheets

(56) References Cited

U.S. PATENT DOCUMENTS

| | | | | |
|---|---|---|---|---|
| 7,373,632 | B1* | 5/2008 | Kawaguchi | G06F 9/465 709/203 |
| 8,572,603 | B2* | 10/2013 | Bansod | G06F 9/445 709/220 |
| 8,650,290 | B2* | 2/2014 | Dare | G06F 3/0481 455/3.01 |
| 8,745,205 | B2* | 6/2014 | Anderson | H04L 9/3213 709/224 |
| 8,904,379 | B2* | 12/2014 | Manahan | H04L 67/34 717/173 |
| 8,918,780 | B2* | 12/2014 | Tagliabue | G06F 3/1285 717/121 |
| 9,455,876 | B1* | 9/2016 | Grebenschikov | H04L 41/20 |
| 9,465,633 | B2* | 10/2016 | Newell | G06F 9/45545 |
| 2003/0018950 | A1* | 1/2003 | Sparks | G06F 8/67 717/100 |
| 2004/0158813 | A1* | 8/2004 | Xia | G06F 8/60 717/116 |
| 2007/0038986 | A1* | 2/2007 | Houser | G06F 9/4426 717/151 |
| 2007/0169110 | A1* | 7/2007 | Gupta | G06F 8/65 717/174 |
| 2007/0174853 | A1* | 7/2007 | Turk | G06F 9/548 719/330 |
| 2007/0220491 | A1* | 9/2007 | Meckelburg | G06Q 10/063 717/124 |
| 2011/0197184 | A1* | 8/2011 | Sheehan | G06F 9/45533 717/168 |
| 2013/0144999 | A1* | 6/2013 | Bubolz | G06F 8/61 709/221 |

FOREIGN PATENT DOCUMENTS

| | | |
|---|---|---|
| CN | 102663081 A | 9/2012 |
| CN | 102710799 A | 10/2012 |

OTHER PUBLICATIONS

Fischer et al., Engage: a deployment management system, Jun. 2012, 11 pages.*

Dikaiakos et al., Minersoft: Software retrieval in grid and cloud computing infrastructures, 2012, 34 pages.*

International Search Report with English translation, dated Oct. 10, 2013, pp. 1-4, issued in International Application No. PCT/CN2013/079402, State Intellectual Property Office of the P.R. China, Beijing, China.

Office Action dated Apr. 19, 2017 for Chinese Application No. 201210575981.3, 16 pages.

* cited by examiner

APPLICATION IMPLEMENTATION METHOD AND APPARATUS

The present application is a continuation application of PCT/CN2013/079402, filed on Jul. 15, 2013 and entitled "APPLICATION IMPLEMENTATION METHOD AND DEVICE", which claims priority to Chinese Patent Application No. 201210575981.3, filed with the Chinese Patent Office on Dec. 26, 2012 and entitled "APPLICATION IMPLEMENTATION METHOD AND APPARATUS", which are incorporated by reference in entirety.

BACKGROUND

The present disclosure relates to the field of terminal applications.

Generally, to implement a function of an application program, the function needs to be installed in a computer that already has the application program installed. For example, the application program may be divided into a main function and an auxiliary function. When the application program is initially installed, generally only the main function of the application program is installed. The auxiliary function is installed when needed by users. That is, in order to implement the auxiliary function of the application program, an auxiliary application program needs to be installed in the terminal. However, during installation, data storage space of the terminal is occupied, which causes poor user experience.

SUMMARY

Examples described throughout the present document provide an application implementation method and apparatus, that provide technical solutions to technical problems, such as those described above.

An aspect of the present document includes an application implementation method, including: acquiring, by a terminal, an installation package of a target application. The application implementation method also includes generating a proxy interface for managing the target application. The application implementation method also includes dynamically loading, by the proxy interface, the installation package by using an operating parameter of the terminal. The application implementation method also includes starting, by the proxy interface, an operation interface of the target application.

In the application implementation method, generating the proxy interface for managing the target application may include generating instructions for dynamically loading the installation package of the target application. The method may also include generating instructions for transferring the operating parameter of the terminal. The method may also include generating instructions for managing creation, display, hiding, and recycling of the target application, to obtain the proxy interface of the target application.

In the application implementation method, acquiring the installation package of the target application may include reading a storage address, of the installation package, in a local memory of the terminal. Alternatively or in addition, the method may also include instructing the terminal to download the installation package of the target application from a remote location.

In the application implementation method, dynamically loading the installation package by using an operating parameter of the terminal, and starting the operation interface of the target application may include loading, by the proxy interface, classes of the installation package by using a java class loader. The method may also include creating, by the proxy interface, a context of running of the target application. The method may also include invoking, by the proxy interface, a creating unit of the installation package by using a java reflection mechanism. The method may also include loading the creating unit by using the operating parameter of the terminal.

In the application implementation method, after dynamically loading the installation package by using the operating parameter of the terminal, the method further may include maintaining a context, a running resource, and a life cycle of the target application in the proxy interface.

In another aspect, an application implementation apparatus is provided, that includes an installation package acquiring unit configured to acquire an installation package of a target application. The application implementation apparatus also includes a proxy generation unit configured to generate a proxy interface for managing the target application. The application implementation apparatus also includes a proxy loading unit configured to dynamically load, by the proxy interface, the installation package by using an operating parameter of a terminal, and start an operation interface of the target application.

Another aspect provides a non-transitory computer readable storage medium, storing computer executable instructions, the non-transitory computer readable storage medium including instructions to acquire an installation package of a target application. The non-transitory computer readable storage medium also includes instructions to generate a proxy interface for managing the target application. The non-transitory computer readable storage medium also includes instructions to control the proxy interface to dynamically load the installation package by using an operating parameter of a terminal and start an operation interface of the target application.

In the examples described throughout the present document, an installation package of a target application may be acquired, and a proxy interface for managing the target application may be generated. The proxy interface may dynamically load the installation package by using an operating parameter of a terminal. The proxy interface may start an operation interface of the target application, so as to implement a function of the target application. The installation package of the target application may not be installed. The proxy interface may serve as an interface between the terminal and the installation package, and when a function to be implemented of the installation package is started, the proxy interface may provide an operating parameter for executing the function. The proxy interface may thus, dynamically write programming instructions and the operating parameter for implementing the target application to memory of the terminal. The terminal may use the target application corresponding to the installation package without installing the installation package.

BRIEF DESCRIPTION OF THE DRAWINGS

The examples may be better understood with reference to the following drawings and description. The components in the figures are not necessarily to scale. Moreover, in the figures, like-referenced numerals designate corresponding parts throughout the different views.

DETAILED DESCRIPTION

Examples described throughout the present document provide an application implementation method and apparatus, which are used to implement a function of a target application without installation of the function itself.

Figure 1:
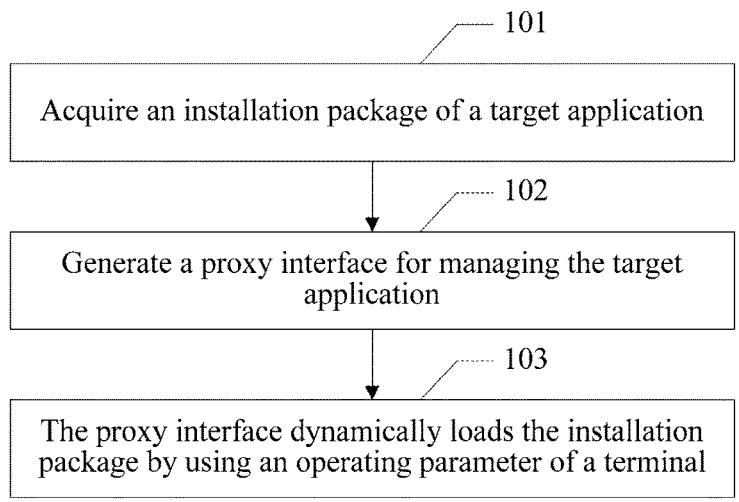
FIG. 1 is a flowchart of an example application implementation method.

FIG. 1 is a flowchart of an example application implementation method. The application implementation method may include at least step 101 to step 103.

Step 101: Acquire an installation package of a target application.

The installation package of the target application may be acquired by using an application implementation apparatus. The target application may be a plugin in an application, or an application on a control platform (for example, Chinese Chess on a QQ game platform), or any other software application.

For example, the plugin may be an application corresponding to an auxiliary function in an application program. The control platform may be an operation platform that has a data transport protocol and interface matching the target application. The control platform may provide an operation and display interface for the target application, and program instructions written for the target application may be supported or identified by the control platform.

Alternatively or in addition, the installation package of the target application may be stored on the apparatus. For example, the installation package of the target application may be stored in a local memory such as a storage device of a terminal, and the installation package of the target application may be acquired by reading a storage address, of the installation package, in the terminal. The installation package of the target application may also be downloaded or transferred from a remote location, such as via a communication network. For example, when a user clicks the target application, if the target application is not installed yet and the installation package of the target application is not stored locally, the terminal may connect to a server that may be specified by a link to a download address of the installation package of the target application. The terminal may subsequently download the installation package.

Step 102: Generate a proxy interface for managing the target application.

The proxy interface for managing the target application may be generated by using the application implementation apparatus. The proxy interface may be an intermediate interface between the terminal and the installation package. When the terminal requests to load a function in the installation package, the proxy interface may provide an operating parameter for implementing the function. For example, if an operation interface of the target application is to be displayed on a screen of the terminal, the proxy interface may provide a display parameter of the terminal (for example, a size and resolution of the screen).

The proxy interface may be an interface in a main program. The proxy interface may be a transparent interface without any button, text, or icon and may acquire information about the terminal. Content displayed in the interface may be acquired from the installation package of the target application. Creation, display, hiding, and recycling of the proxy interface may be managed by the terminal.

Step 103: The proxy interface dynamically loads the installation package by using an operating parameter of a terminal.

The proxy interface may dynamically load the installation package by using the operating parameter of the terminal and start the operation interface of the target application.

When the terminal requests to load a function in the installation package, the proxy interface may read contents of the installation package, and acquire, from the terminal, the operating parameter that is to be provided by the terminal to implement the function. The proxy interface may dynamically write programming instructions and the operating parameter for implementing the target application in the installation package to memory (such as a dynamic storage device) of the terminal. The proxy interface may start the operation interface of the target application, so that the user can use a function corresponding to the target application.

The operating parameter may include a display parameter of the terminal, screen and key events, an International Mobile Equipment Identity (IMEI) number, a current network type, Global Positioning System (GPS) information, a language type set in the terminal, a terminal sensor, and the like or a combination thereof.

The application implementation apparatus may be a computer such as a mobile phone, a smart phone, a tablet computer, a laptop, or any other hardware device that includes a processor and a memory among other components. The application implementation apparatus may be another application program, which may be integrated into a main program of an application. Alternatively or in addition, the application implementation apparatus may be integrated into a main program of a control platform.

An installation package of the target application may be acquired, and a proxy interface for managing the target application may be generated. The proxy interface may dynamically load the installation package by using an operating parameter of the terminal and start an operation interface of the target application, so as to implement a function of the target application. The installation package of the target application may not be installed on the terminal. The proxy interface may serve as an interface between the terminal and the installation package. When a function of the installation package is started, the proxy interface may provide an operating parameter for executing the function, and dynamically write programming instructions and the operating parameter for implementing the target application to a memory of the terminal. Thus, the terminal may use the target application corresponding to the installation package without installing the installation package.

In addition to serving as an interface between the terminal and the installation package, the proxy interface may manage parameters of the target application and maintain normal operation of the target application.

Figure 2:
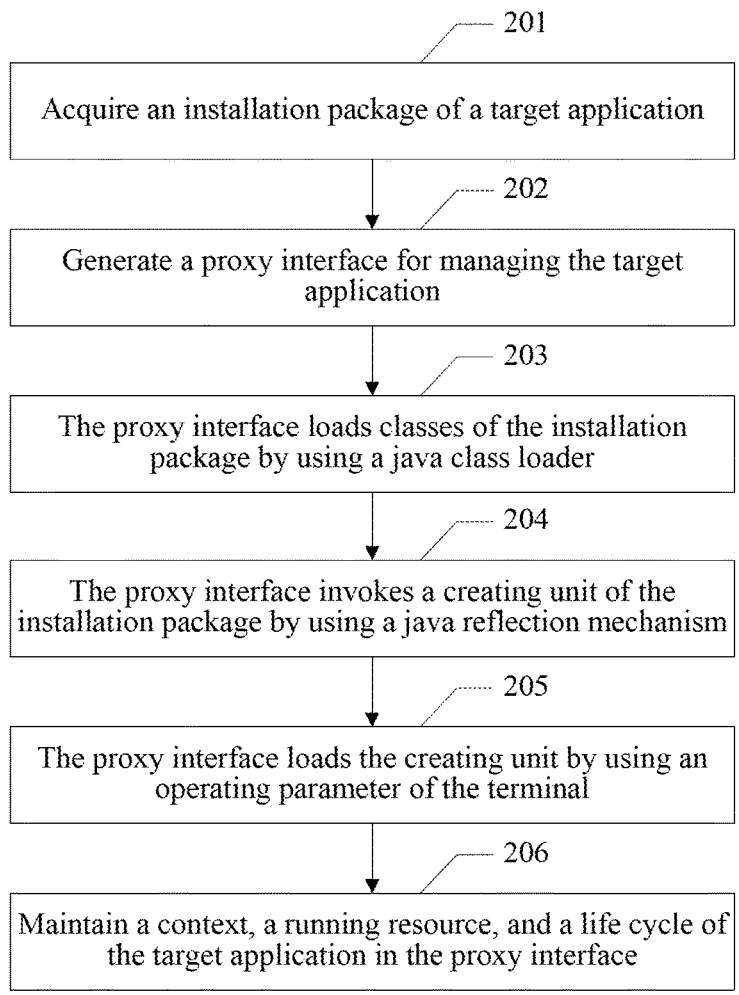
FIG. 2 is a flowchart of an example application implementation method.

FIG. 2 is a flowchart of an example application implementation method. For example, the application implementation method according to FIG. 2 may include at least step 201 to step 206.

Step 201: Acquire an installation package of a target application.

The installation package of the target application may be acquired by using an application implementation apparatus. The target application may be a software program. For example, the target application may be a program installed on a computer, or an application (commonly referred to as an app) on a portable device such as a mobile phone or a tablet. In another example, the target application may be a plugin in an application, or an application on a control platform (for example, Chinese Chess on a QQ game platform).

For example, the plugin may be an application corresponding to an auxiliary function in an application program. The control platform may be an operation platform that has a data transport protocol and interface matching the target application. The control platform may provide an operation and display interface for the target application, and programming instructions written for the target application may be supported or identified by the control platform.

Alternatively or in addition, the installation package of the target application may be stored on the apparatus. For example, the installation package of the target application may be stored in a static storage device of a terminal, and the installation package of the target application may be acquired by reading a storage address, of the installation package, in the terminal. The installation package of the target application may also be downloaded or transferred from a remote location, such as via a communication network. For example, when a user clicks the target application, if the target application is not installed yet and the installation package of the target application is not stored locally, the terminal may connect to a server that may be specified by a link to a download address of the installation package of the target application. The terminal may subsequently download the installation package.

Step 202: Generate a proxy interface for managing the target application.

The proxy interface for managing the target application may be generated by using the application implementation apparatus. The proxy interface may be an intermediate interface between the terminal and the installation package. When the terminal requests to load a function in the installation package, the proxy interface may provide an operating parameter for implementing the function. For example, if an operation interface of the target application is to be displayed on a screen of the terminal, the proxy interface may provide a display parameter of the terminal (for example, a size and resolution of the screen).

The proxy interface may be an interface in a main program. The proxy interface may be a transparent interface without any button, text, or icon and may acquire information about the terminal. Content displayed in the interface may be acquired from the installation package of the target application. Creation, display, hiding, and recycling of the proxy interface may be managed by the terminal.

Generating the proxy interface for managing the target application may include creating programming instructions for dynamically loading the installation package of the target application. Further, programming instructions for transferring the operating parameter of the terminal may be created. Additionally, programming instructions for managing creation, display, hiding, recycling of the target application, and to obtain the proxy interface of the target application may be created.

The programming instructions for dynamically loading the installation package of the target application may include instructions for dynamically loading logic of the installation package of the target application, instructions for loading a character string, a picture, a sound file, or any other file of the installation package of the target application.

The code for managing the target application may include: code of an element such as a button, a text, an icon, and the like in the interface of the target application, code for transferring screen and key events, and the like.

After the proxy interface of the target application is generated, the proxy interface may parse an installation package at a specified memory location (for example, a storage address, of the installation package of the target application, in the terminal). The proxy interface may acquire a version number and a package name of the target application from the installation package. If parsing of the installation package fails, start of the target application fails.

Step 203: The proxy interface loads classes of the installation package by using a java class loader.

When the proxy interface requests to read the installation package, the proxy interface may create a Resource, parse a resource file in the installation package, and load classes (class.dex) of the installation package by using a java class loader (DexClassLoader). The proxy interface may create a context for executing the target application. The classes of the installation package may include a main program, a tool, and service logic of the target application.

For example, the target application may be a plugin in an application, or an application on a control platform. If the target application is a plugin in an application, and an interface class (PluginAct) for starting the plugin is specified, the DexClassLoader may dynamically load the specified PluginAct. If the interface class (PluginAct) for starting the plugin is not specified, a plugin file may be searched for and the first interface class PluginAct that contains a launcher identifier may be identified. The DexClassLoader may dynamically load the PluginAct.

The context of the target application may be different from a context of the main application program of the target application. Creation of the context may be based on the resource management interface (Resource). For example, the resource management interface may read the resource file. The resource file may include data such as pictures, main bodies, and the like. Creation of the resource management interface may be managed by a resource manager (such as AssetManager). The resource manager may read data in the installation package.

Step 204: The proxy interface initiates a creating unit of the installation package by using a java reflection mechanism.

The proxy interface may invoke or initiate the creating unit (such as onCreate) of the installation package by using the java reflection mechanism.

The java reflection mechanism refers to coercively invoking a method that is not disclosed or is hidden in the target application and acquiring an attribute of the target application by obtaining an object of the target application.

Step 205: The proxy interface loads the creating unit by using an operating parameter of the terminal.

The proxy interface may load the creating unit by using the operating parameter of the terminal, so that the screen of the terminal may display the operation interface of the target application, and the user can use the function of the target application in the operation interface.

Step 206: The proxy interface maintains a context, a running resource, and a life cycle of the target application.

After starting the operation interface of the target application, the proxy interface may store the context, the running resource, and the life cycle of the target application.

The context of the target application may include a display parameter of the terminal, screen and key events, whether the screen is turned off, a memory use condition, a Central Processing Unit (CPU) state, a current network type, location information, whether it is in a call, and the like.

The running resource of the target application may include a language currently set in the terminal, a text string, a picture, a sound file, and a screen element such as a text, a button, an icon, or the like.

In an example, the life cycle of the target application may start from creation of the interface, and end with destruction of the interface, between which is a display (the screen is turned on and a foreground is switched to) stage and a hidden (the screen is turned off and a background is switched to) stage.

For example, the life cycle may include a creation time of the target application and a condition for closing or minimizing (that is, retreating to the background) of the target application. The condition of closing or minimizing the target application may include Closing or minimizing the target application in response to the user sending a closing or minimizing instruction (such as by a click operation). The condition of closing or minimizing the target application may also include closing or minimizing the current target application in response to the terminal receiving a call, such as in case of the terminal being a mobile phone.

Maintaining the context by the proxy interface may further include synchronization and matching between a terminal operation key and an operation function of the target application.

Figure 3:
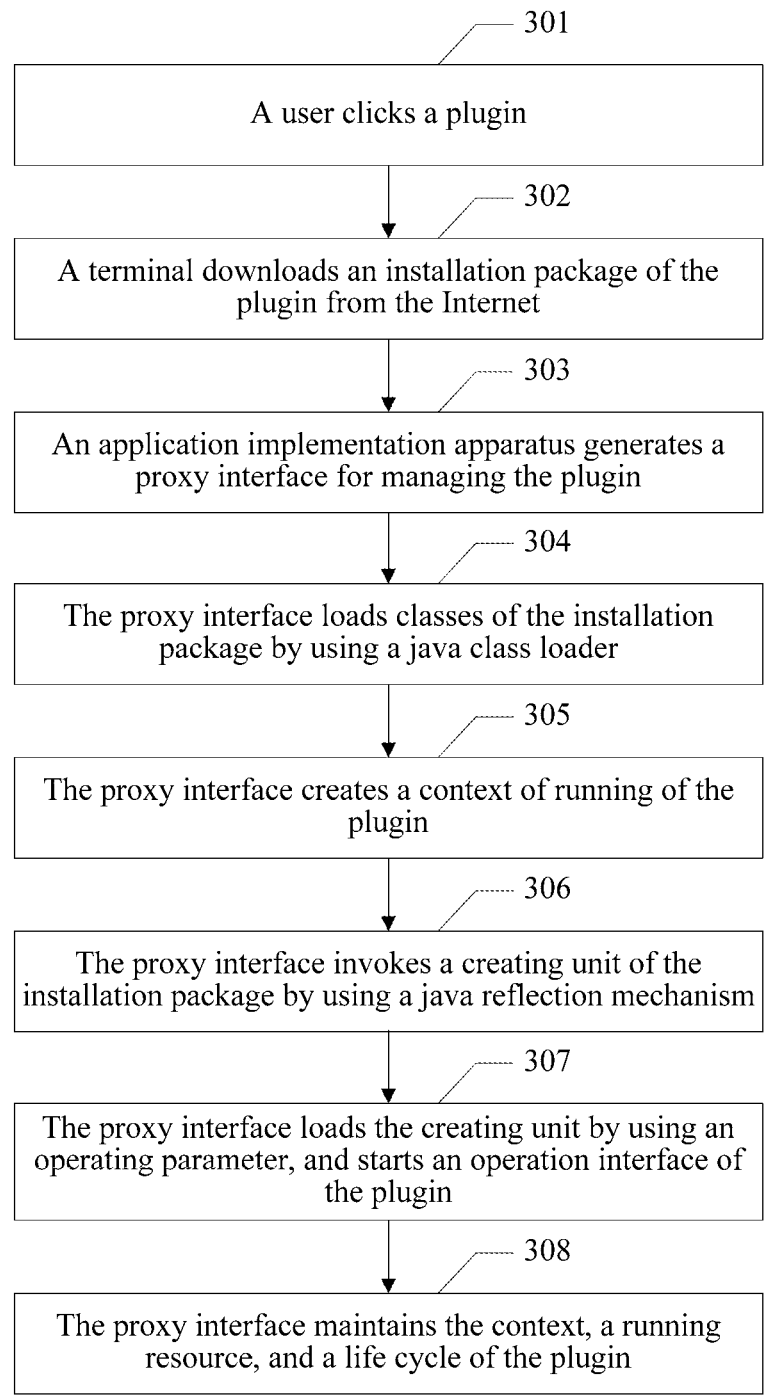
FIG. 3 is a flowchart of an example application implementation method.

The application implementation method described throughout the present document is further described by using a specific application scenario in which the target application is a plugin of a main application program. Referring to FIG. 3, the method includes at least step 301 to step 308.

Step 301: A user selects a plugin.

The user selects the plugin, such as by clicking. The terminal, in response, may detect if the plugin is installed on the terminal. Alternatively or in addition, the terminal may detect if an installation package of the plugin is stored locally. Step 302 may be performed if the plugin is not installed and if a local installation package is unavailable.

Step 302: The terminal downloads an installation package of the plugin.

The terminal may connect to a server, using a link to a download address of the installation package of the plugin, and download the installation package of the plugin.

Step 303: An application implementation apparatus generates a proxy interface for managing the plugin.

The proxy interface for managing the plugin may be generated by an application implementation apparatus of a main application program installed in the terminal or a control platform.

After the proxy interface for managing the plugin is generated, the proxy interface may parse the installation package at a specified memory location (for example, a storage address, of the installation package of the plugin, in the terminal). The proxy interface may acquire a version number and a package name of the plugin from the installation package. If parsing of the installation package fails, starting the plugin may fail.

Step 304: The proxy interface loads classes of the installation package by using a java class loader.

For example, if an interface class (such as PluginAct) for starting the plugin is specified, a class loader (such as a DexClassLoader) may dynamically load the specified interface class. If the interface class for starting the plugin is not specified, a plugin file may be searched for. The first interface class that contains a launcher identifier may be identified, and the class loader may dynamically loads the plugin from the file that is identified.

Step 305: The proxy interface creates a context of running of the plugin.

Creation of the context by the proxy interface may be based on the resource management interface (such as Resource) to read a resource file. Creation of the resource management interface may be based on a resource manager (such as AssetManager) to read data from the installation package.

Step 306: The proxy interface invokes a creating unit of the installation package by using a java reflection mechanism.

Step 307: The proxy interface loads the creating unit by using an operating parameter, and starts an operation interface of the plugin.

Step 308: The proxy interface maintains the context, a running resource, and a life cycle of the plugin.

After starting the operation interface of the target application, the proxy interface may store and maintains the context, the running resource, and the life cycle of the plugin.

Figure 4:
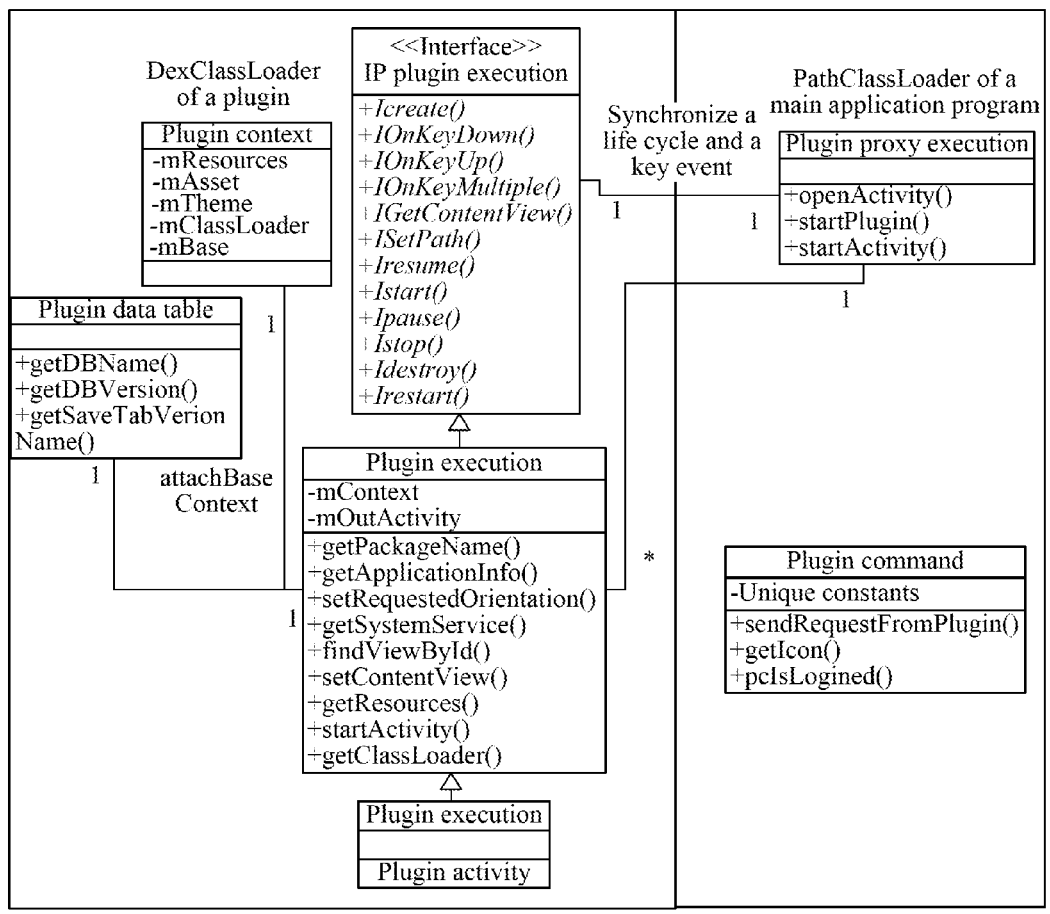
FIG. 4 is a diagram of an example architecture of a plugin.

FIG. 4 is a schematic diagram of an example architecture of a plugin. The plugin may include three parts. The first part may be a proxy interface (such as ProxyAct). The second part may be a base class (such as PluginAct) of a plugin interface. The third part may be a plugin common class, that includes a plugin context (such as PluginContext), a plugin data table (such as PluginTableManager), and a class (such as PluginComm) of communication between the plugin and data of a main program and a network. Proxy execution (such as ProxyActivity) may encapsulate implementation of synchronizing a life cycle and a control event with the plugin interface. The base class of the plugin interface may encapsulate creation of the plugin context. For development work of the plugin, only the base class of the plugin interface may be inherited, and other steps may be the same as those of developing a non-plugin program.

The above example describes an application scenario by using some specific examples. It can be understood that, there may be many more application scenarios, and that the present application is not limited only to the above example.

Figure 5:
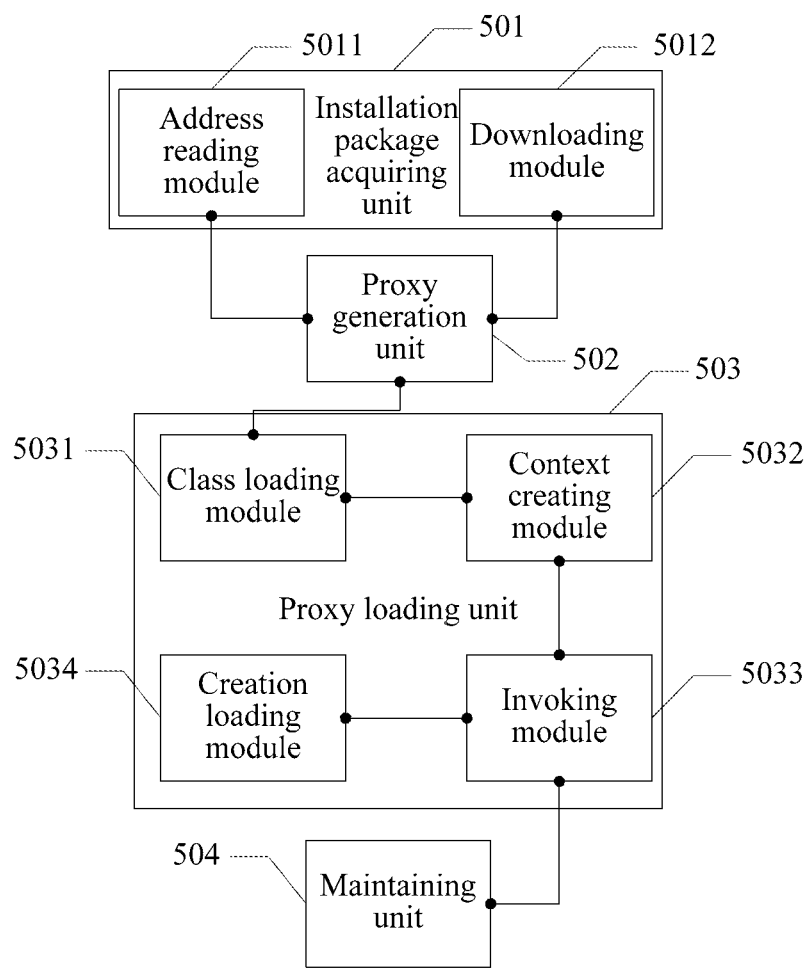
FIG. 5 is a structural diagram of an example application implementation apparatus.

FIG. 5 illustrates an example application implementation apparatus. The apparatus, for example, may implement the application implementation method examples described throughout the present document. The application implementation apparatus may include, among other components, an installation package acquiring unit 501, a proxy generation unit 502, and a proxy loading unit 503.

The installation package acquiring unit 501 may acquire an installation package of the target application. The proxy generation unit 502 may generate the proxy interface for managing the target application. The proxy loading unit 503 may dynamically load, by the proxy interface, the installation package by using an operating parameter of the terminal, and start an operation interface of the target application.

The operating parameter of the terminal may include, for example, any one or a combination of a display parameter of the terminal, screen and key events, an IMEI number, a current network type, GPS information, a language type set in the terminal, a terminal sensor, and the like.

In another example application implementation apparatus, the proxy generation unit 502 may create program instructions for dynamically loading the installation package of the target application, create programming instructions for transferring the operating parameter of the terminal, and create programming instructions for managing creation, display, hiding, and recycling of the target application to obtain the proxy interface of the target application.

In another example, the proxy loading unit 503 may include, among other components, a class loading module 5031, a context creating module 5032, an invoking module 5033, and a creation loading module 5034.

The class loading module 5031 may load classes of the installation package such as by using a java class loader such as DexClassLoader. The context creating module 5032 may create a context for execution of the target application. The invoking module 5033 may invoke a creating unit such as onCreate method of the installation package such as by using a java reflection mechanism. The creation loading module 5034 may load the creating unit by using the operating parameter.

In another example, the application implementation apparatus may further include a maintaining unit 504. The maintaining unit 504 may maintain the context, a running resource, and a life cycle of the target application in the proxy interface.

In an example, the installation package acquiring unit 501 may include an address reading module 5011, or a downloading module 5012. The address reading module 5011 may read a storage address, of the installation package, in the terminal The downloading module 5012 may instruct the terminal to download the installation package of the target application such as from a remote computer over a communication network such as the Internet.

In the examples described throughout the present document, it should be understood that the disclosed apparatus and methods may be implemented in other manners. For example, the described apparatus are merely exemplary. For example, the unit division is merely one possible logical function division and other division are possible. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one location, or may be distributed on a plurality of network units. Some or all of the units may be selected according to actual needs to achieve the objectives of the technical solutions of the examples described.

In addition, functional units in the examples of the present document may be integrated into one processing unit, or each of the units may exist alone physically, or two or more units may be integrated into one unit. The integrated unit may be implemented in the form of hardware, or may be implemented in the form of a software functional unit.

When the integrated unit is implemented in a form of a software functional unit and sold or used as an independent product, the integrated unit may be stored in a computer-readable storage medium. Based on such an understanding, the technical solutions of the present document, the part contributing to the existing technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the examples throughout the present document. The foregoing storage medium may include any medium that can store program instructions, such as a USB flash drive, a removable hard disk, a read-only memory (ROM), a random access memory (RAM), a magnetic disk, or an optical disc.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. An application implementation method, comprising:
acquiring, by a terminal, an installation package of a target application, wherein the acquiring the installation package of the target application comprises:
reading a storage address, of the installation package, in a local memory of the terminal, or
instructing the terminal to download the installation package of the target application from a remote location;
generating a proxy interface for managing the target application;
dynamically loading, by the proxy interface, the installation package by using an operating parameter of the terminal;
dynamically write, by the proxy interface, programming instructions and an operating parameter in the installation package of the target application to a memory of the terminal, and
starting, by the proxy interface, an operation interface of the target application, wherein after dynamically loading the installation package by using the operating parameter of the terminal, the method further comprises:
maintaining a context, a running resource, and a life cycle of the target application in the proxy interface.

2. The method according to claim 1, wherein the generating a proxy interface for managing the target application comprises:
generating instructions for dynamically loading the installation package of the target application;
generating instructions for transferring the operating parameter of the terminal; and generating instructions for managing creation, display, hiding, and recycling of the target application, to obtain the proxy interface of the target application.

3. The method according to claim 1, wherein dynamically loading the installation package by using an operating parameter of the terminal, and starting the operation interface of the target application comprises:
loading, by the proxy interface, classes of the installation package by using a java class loader;
creating, by the proxy interface, a context of running of the target application;
invoking, by the proxy interface, a creating unit of the installation package by using a java reflection mechanism; and
loading the creating unit by using the operating parameter of the terminal.

4. The method according to claim 1, wherein the content displayed in the proxy interface is acquired from the installation package of the target application.

5. An application implementation apparatus, comprising:
an installation package acquiring unit stored in a memory configured to acquire an installation package of a target application, wherein the installation package acquiring unit comprises:
an address reading module configured to read a storage address, of the installation package, from a local memory in the terminal, or
a downloading module configured to instruct the terminal to download the installation package of the target application from a remote location;
a proxy generation unit stored in a memory configured to generate a proxy interface for managing the target application;
a proxy loading unit stored in a memory configured to dynamically load, by the proxy interface, the installation package by using an operating parameter of a terminal, dynamically write, by the proxy interface, programming instructions and an operating parameter in the installation package of the target application to a memory of the terminal, and start an operation interface of the target application; and
a maintaining unit stored in a memory configured to maintain a context, a running resource, and a life cycle of the target application in the proxy interface.

6. The apparatus according to claim 5, wherein the proxy generation unit is further configured to:
generate instructions to dynamically load the installation package of the target application;
generate instructions to transfer the operating parameter of the terminal; and
generate instructions to manage creation, display, hiding, and recycling of the target application, to obtain the proxy interface of the target application.

7. The apparatus according to claim 5, wherein the proxy loading unit comprises:
a class loading module configured to load classes of the installation package;
a context creating module configured to create a context for execution of the target application;
an invoking module configured to invoke a creating unit of the installation package; and
a creation loading module configured to load the creating unit by using the operating parameter of the terminal.

8. A non-transitory computer readable storage medium, storing computer executable instructions, the non-transitory computer readable storage medium comprising:
instructions to acquire an installation package of a target application, wherein the instructions to acquire the installation package of the target application comprises;
instructions to read a storage address, of the installation package, in a local memory of the terminal, or
instructions to instruct the terminal to download the installation package of the target application from a remote location;
instructions to generate a proxy interface for managing the target application; and
instructions to control the proxy interface to dynamically load the installation package by using an operating parameter of a terminal, dynamically write programming instructions and an operating parameter in the installation package of the target application to a memory of the terminal, and start an operation interface of the target application; and
instructions to maintain a context, a running resource, and a life cycle of the target application in the proxy interface.

* * * * *